(12) United States Patent
Hongo et al.

(10) Patent No.: US 7,858,246 B2
(45) Date of Patent: Dec. 28, 2010

(54) GAS-LIQUID SEPARATION SYSTEM AND FUEL CELL SYSTEM

(75) Inventors: Takuya Hongo, Kawasaki (JP); Takahiro Suzuki, Tokyo (JP); Atsushi Sadamoto, Kawasaki (JP); Kei Matsuoka, Kawasaki (JP); Norihiro Tomimatsu, Mitaka (JP); Motoi Goto, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 303 days.

(21) Appl. No.: 12/034,235

(22) Filed: Feb. 20, 2008

(65) Prior Publication Data

US 2008/0202085 A1    Aug. 28, 2008

(30) Foreign Application Priority Data

Feb. 26, 2007    (JP) ............................ P2007-045507

(51) Int. Cl.
*H01M 8/06* (2006.01)

(52) U.S. Cl. ................... 429/410; 429/415; 429/417; 429/443; 429/447

(58) Field of Classification Search ............... 429/14, 429/25, 412, 410, 415, 417, 443, 444; *B01D 53/00, B01D 53/22; H01M 8/04, 8/06*
See application file for complete search history.

(56) References Cited

U.S. PATENT DOCUMENTS

2005/0058862 A1 *    3/2005    Sone et al. .................. 429/22
2007/0281191 A1     12/2007    Goto

FOREIGN PATENT DOCUMENTS

JP     2005-238217     9/2005

OTHER PUBLICATIONS

U.S. Appl. No. 12/034,399, filed Feb. 20, 2008, Hongo, et al.

* cited by examiner

*Primary Examiner*—Jennifer K Michener
*Assistant Examiner*—Heng M Chan
(74) *Attorney, Agent, or Firm*—Oblon, Spivak, McClelland, Maier & Neustadt, L.L.P.

(57) ABSTRACT

A gas-liquid separation system includes a housing at which a gas inlet and a gas outlet are provided; a separation pipe contained in the housing; a separation membrane provided in the separation pipe; and a pump configured to inject a gas into the housing through the gas inlet from an outside of the housing to the gas outlet.

14 Claims, 11 Drawing Sheets

GAS-LIQUID SEPARATION SYSTEM AND FUEL CELL SYSTEM

CROSS REFERENCE TO RELATED APPLICATIONS AND INCORPORATION BY REFERENCE

This application is based upon and claims the benefit of priority from the prior Japanese Patent Application No. P2007-45507, filed on Feb. 26, 2007; the entire contents of which are incorporated herein by reference.

BACKGROUND OF THE INVENTION

1. Field of the Invention

The present invention relates to a fuel cell system and a gas-liquid separation system for the fuel cell system.

2. Description of the Related Art

A direct fuel cell that directly supplies liquid fuel such as alcohol to a power generation unit does not require auxiliaries such as an evaporator and a reformer. Accordingly, it is expected that the direct fuel cell will be used for such as a small power supply of a portable instrument. For example, a direct methanol fuel cell (DMFC) includes a cell stack (electromotive unit) in which a plurality of single cells, each of which has an anode and a cathode, are stacked on one another. In the electromotive unit, diluted methanol is supplied to an anode side, and the air is supplied to a cathode side, whereby a chemical reaction is caused to generate power. As a result, a gas-liquid two-phase flow containing unreacted methanol and carbonic acid gas is discharged from the anode side, and water is discharged from the cathode side.

The gas-liquid two-phase flow discharged from the anode side is fed to a fuel tank through a collection passage and the like, and is adjusted into a methanol solution with the optimum concentration for the power generation in the fuel tank connected to the collection passage. Thereafter, the methanol solution is circulated to the anode side of the electromotive unit. In order to efficiently reuse the gas-liquid two-phase flow discharged from the anode side, it is necessary, in advance, to separate the carbonic acid gas from the gas-liquid two-phase flow and to discharge the separated carbonic acid gas so that the carbonic acid gas contained in the gas-liquid two-phase flow cannot be circulated to the anode side. As a method of separating and discharging the carbonic acid gas, for example, there is known a method of providing a gas-liquid separator, in which a gas-liquid separation membrane is disposed, in a passage on an anode outlet side (for instance, refer to JP-A No. 2005-238217 (KOKAI)).

However, since a vapor phase discharged from the gas-liquid separation membrane contains steam, in some case, the steam that has flown out through the gas-liquid separation membrane fills a space in the gas-liquid separator, causing condensation. In particular, a temperature of the gas-liquid two-phase flow discharged from the electromotive unit is higher than room temperature, and in addition, a moisture content of the steam is large. Accordingly, the condensation occurs in the gas-liquid separator unless a temperature of the gas-liquid separator is set higher than the temperature of the gas-liquid two-phase flow.

SUMMARY OF THE INVENTION

An aspect of the present invention inheres in a gas-liquid separation system encompassing a housing at which a gas inlet and a gas outlet are provided; a separation pipe contained in the housing; a separation membrane provided in the separation pipe; and a pump configured to inject a gas into the housing through the gas inlet from an outside of the housing to the gas outlet.

An other aspect of the present invention inheres in a fuel cell system encompassing an electromotive unit including an anode and a cathode; a gas-liquid separator connected to the anode, including a housing at which a gas inlet and a gas outlet are provided, a separation pipe contained in the housing; and a separation membrane provided in the separation pipe; and a pump configured to inject a gas into the housing through the gas inlet from an outside of the housing to the gas outlet; and a fuel tank storing a fuel including a liquid discharged from the separation pipe, the fuel being circulated to the anode.

DETAILED DESCRIPTION OF THE INVENTION

Figure 1:
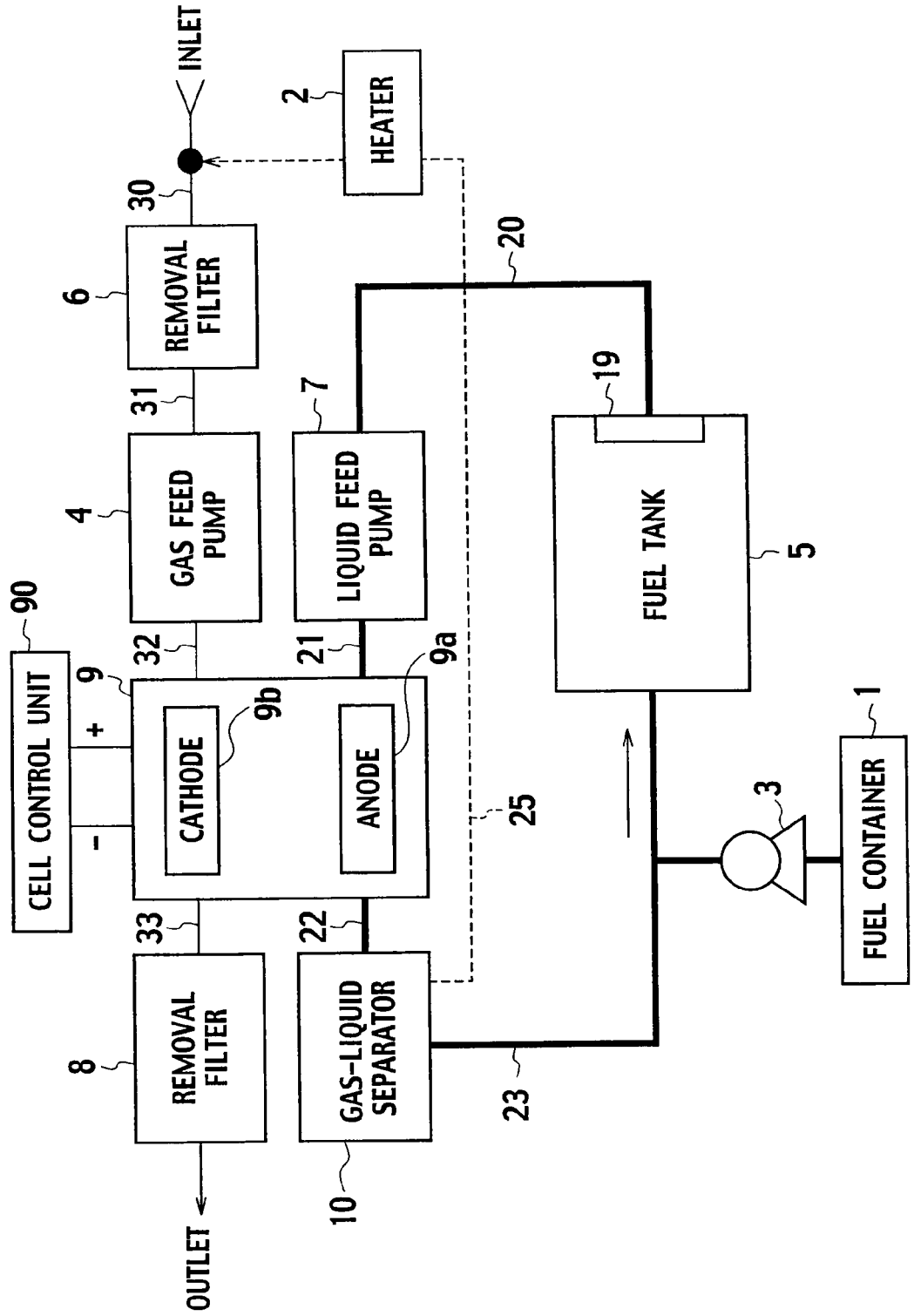
FIG. 1 is a block diagram illustrating an example of a fuel cell system according to a first embodiment.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

In the following descriptions, numerous details are set forth such as specific signal values, etc. to provide a thorough understanding of the present invention. However, it will be obvious to those skilled in the art that the present invention may be practiced without such specific details.

First Embodiment

As shown in FIG. 1, a fuel cell system (gas-liquid separation system) according to a first embodiment includes: an electromotive unit 9 having an anode 9$a$ and a cathode 9$b$; a gas-liquid separator 10 that separates gas-liquid mixed fluid, which is discharged from the anode 9a, into gas and liquid; and a fuel tank 5 that mixes fluid discharged from the gas-liquid separator 10 with high-concentration fuel supplied from a fuel container 1 and prepares fuel to be supplied to the anode 9a.

The fuel tank 5 is connected through a pipe 20 to a liquid feed pump 7. The liquid feed pump 7 is connected through a pipe 21 to the anode 9a of the electromotive unit 9. The anode 9a is connected through a pipe 22 to the gas-liquid separator 10. The gas-liquid separator 10 is connected through a pipe 23 to the fuel tank 5. The pipes 20, 21, 22 and 23 form a "fuel passage" for circulating the fuel, which is supplied to the anode 9a, to the anode 9a one more time.

A gas feed pump 4 is connected to an upstream side of the cathode 9b by a pipe 32. A removal filter 6 is connected to an upstream side of the gas feed pump 4 by a pipe 31. An inlet is disposed on a pipe 30 on an upstream side of the removal filter 6. A removal filter 8 is connected to a downstream side of the cathode 9b by a pipe 33. An outlet is disposed on a downstream side of the removal filter 8. The inlet, the pipes 30, 32 and 33, and the outlet form an "air passage" for flowing the air through the cathode 9b.

The fuel container 1 is connected through a pump 3 to the pipe 23. The fuel container 1 has a hermetically sealed structure, and houses a high-concentration fuel. As the high-concentration fuel, for example, methanol liquid with a purity of 99.9% or more or a mixed solution of water and methanol with a concentration of 10 mol/L or more, or the like is usable. The high-concentration fuel in the fuel container 1, which is supplied through the pipe 23 to the fuel tank 5 by the pump 3, is mixed with water and the fluid discharged from the gas-liquid separator 10 in the fuel tank 5, and is prepared into fuel (methanol solution) with a fixed concentration.

Various sensors 19 are provide in the fuel tank 5. As the sensors 19, for example, usable are a water level sensor for measuring an altitude of a level (water level) of the fuel and detecting a residual amount of the fuel, an inclination sensor for measuring an inclination degree of the fuel tank 5 and detecting a capability of feeding the fuel, and the like. The liquid feed pump 7 supplies the fuel in the fuel tank 5 through the pipe 20 and the pipe 21 to the anode 9a of the electromotive unit 9.

As the electromotive unit 9, a cell stack in which a plurality of single cells are stacked on one another is suitable. Here, each single cell includes the anode 9a, the cathode 9b, and a membrane electrode assembly (MEA) 9c (refer to FIG. 3) sandwiched between the anode 9a and the cathode 9b. Power generated in the electromotive unit 9 is controlled by a cell control unit 90 connected to the electromotive unit 9, and is supplied to an instrument to be supplied with the power. The cell control unit 90 controls a power generation capability of the electromotive unit 9 based on detection signals from the sensors 19.

In the case of operating the fuel cell system shown in FIG. 1, first, the high-concentration fuel is supplied from the fuel container 1 to the fuel tank 5, and the methanol solution with such a concentration suitable for the power generation is prepared in the fuel tank 5. The methanol solution in the fuel tank 5 is supplied from the liquid feed pump 7 through the pipe 20 and the pipe 21 to the anode 9a. In the anode 9a, by-products such as carbon dioxide and water are generated from the methanol solution by a chemical reaction. Gas-liquid mixed fluid (gas-liquid two-phase flow) containing the by-products and an unreacted methanol solution, which are discharged from the anode 9a, is supplied through the pipe 22 to the gas-liquid separator 10. Gas-liquid separation is performed in the gas-liquid separator 10. The fluid after being subjected to the separation is supplied again to the fuel tank 5 through the pipe 23.

On the cathode 9b side, the air is fed from the inlet through the pipe 30, and the fed air is supplied through the removal filter 6 and the pipes 31 and 32 to the cathode 9b by the air feed pump 4. In the cathode 9b, a by-product such as water is generated by a chemical reaction. The by-product and exhaust gas are exhausted from the outlet through the pipe 33 and the removal filter 8.

Figure 2:
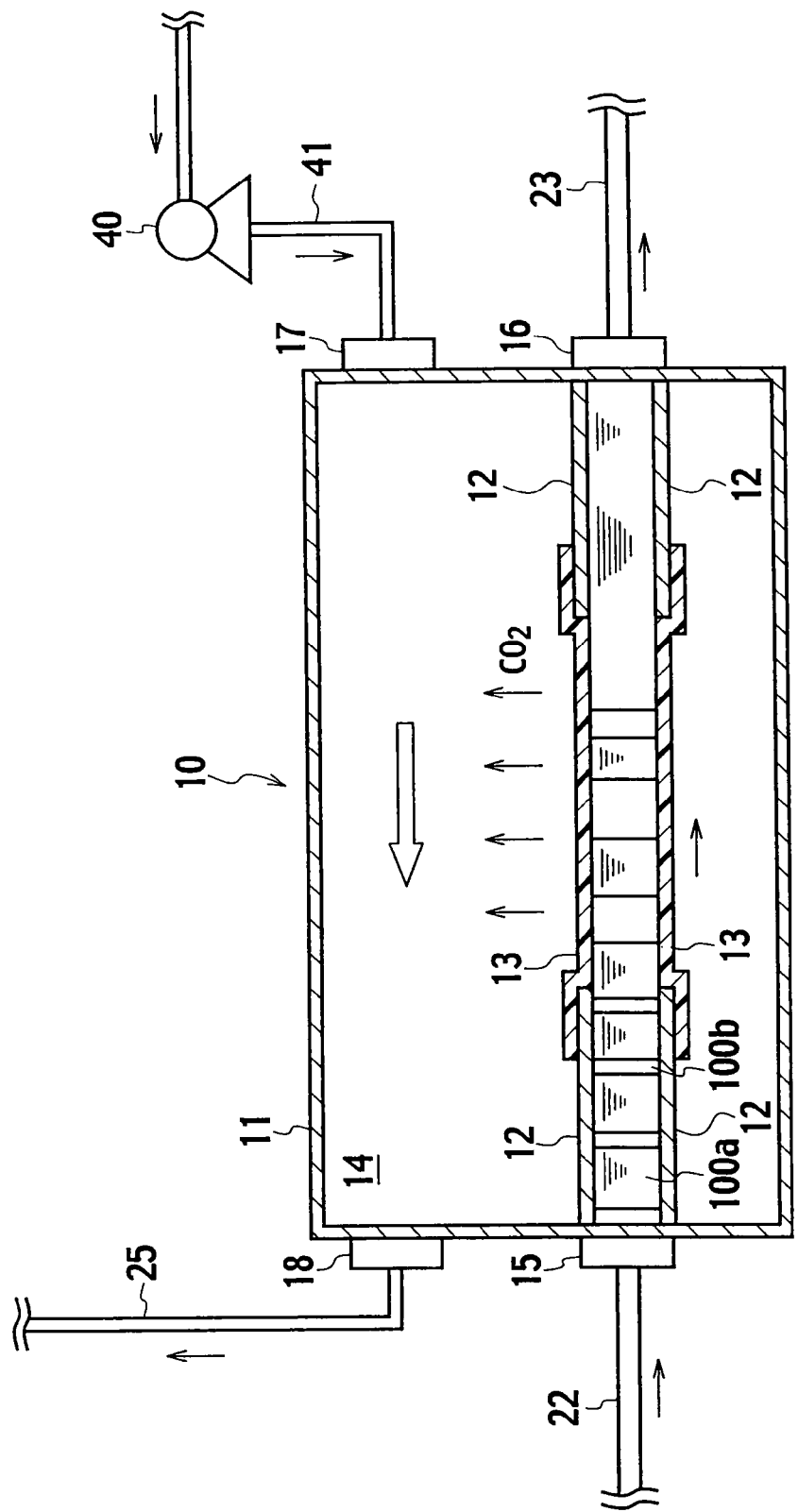
FIG. 2 is a cross-sectional view illustrating an example of a gas-liquid separator according to the first embodiment.

Details of the gas-liquid separator 10 shown in FIG. 1 are shown in FIG. 2. The gas-liquid separator 10 according to the first embodiment includes: a housing 11 in which a gas inlet 17 and a gas outlet 18 are provided; a separation pipe (separation tube) 12 housed in the housing 11; and a separation membrane 13 provided in the separation pipe 12. As the separation membrane 13, for example, one is usable, in which a porous membrane made of hydrophobic polytetrafluoroethylene (PTFE) with a pore diameter of approximately 1 μm and a porosity of approximately 70% is formed into a tube shape, and the porous membrane thus formed into the tube shape is connected to the separation pipe 12 by a connector or the like.

A pump 40 is connected to an upstream side of the gas inlet 17 by a pipe 41. The pump 40 sucks gas in an outside of the gas-liquid separator 10, and supplies the gas through the pipe 41 and the gas inlet 17 into a region (herein after, referred to as a spatial region 14) that surrounds the separation pipe 12 placed in the housing 11. The air is suitable as the gas to be supplied into the spatial region 14. The gas sucked by the pump 40 flows through the spatial region 14, and is brought into contact with gas containing steam and carbonic acid gas ($CO_2$), which flows out of the separation membrane 13. The gas after being brought into the contact is exhausted to the outside of the gas-liquid separator 10 through a pipe 25 connected to the gas outlet 18. As shown in FIG. 1, the gas thus exhausted is re-introducible to the pipe 30 after being heated by a heater 2 connected to the pipe 25.

The housing 11 shown in FIG. 2 includes an inlet 15 and an outlet 16, which are connected to the separation pipe 12. The pipe 22 is connected to the inlet 15. The pipe 23 is connected to the outlet 16. The fluid discharged from the anode 9a of FIG. 1 passes through the pipe 22, and is supplied from the inlet 15 into the separation pipe 12 of FIG. 2. Hence, when the fuel cell system is operated, the gas-liquid mixed fluid containing liquid 100a and gas 100b flows in the separation pipe 12, in which the liquid 10a contains methanol and water, and the gas 100b is such as carbonic acid gas.

In the gas-liquid separator 10, an inner pressure of the separation pipe 12 is set higher than a pressure in the spatial region 14, whereby the gas-liquid separation is performed. The inner pressure of the separation pipe 12 is set higher than the pressure in the spatial region 14, whereby the gas 100b in the fluid in the separation pipe 12 flows out of micro pores of the separation membrane 13 to the spatial region 14 of the housing 11. Meanwhile, the liquid 100a is suppressed from permeating the separation membrane 13 since a surface tension acts in a direction of inhibiting entrance of the liquid 100a into the pores owing to the hydrophobic property of the separation membrane 13. Accordingly, the liquid 100a flows to the outlet 16 side of the separation pipe 12.

Since the gas that flows out to the spatial region 14 through the separation membrane 13 contains steam, there is an apprehension that the flowing-out steam may cause condensation. By the pump 40, the gas-liquid separator 10 shown in FIG. 2 flows the gas, which is introduced from the outside of the housing 11, in the spatial region 14 of the housing 11, and brings the steam-containing gas that flows out of the separation pipe 12 into contact with the external gas. The external gas brought into contact with the steam-containing gas is discharged to the outside of the gas-liquid separator 10 from the gas outlet 18. Accordingly, a moisture content of the steam in the spatial region 14 can be reduced more than in the case of using a container that does not have the gas inlet 17, and the condensation can be suppressed.

Moreover, in the gas-liquid separator 10 shown in FIG. 2, the pump 40 is connected to the upstream side of the gas inlet 17, and accordingly, the pump 40 is not exposed to the steam present in the housing 11. Therefore, various devices of a type that does not permit the entrance of the steam can be used as the pump 40, and accordingly, a degree of freedom in selecting the device is also enhanced.

First Modification

Figure 3:
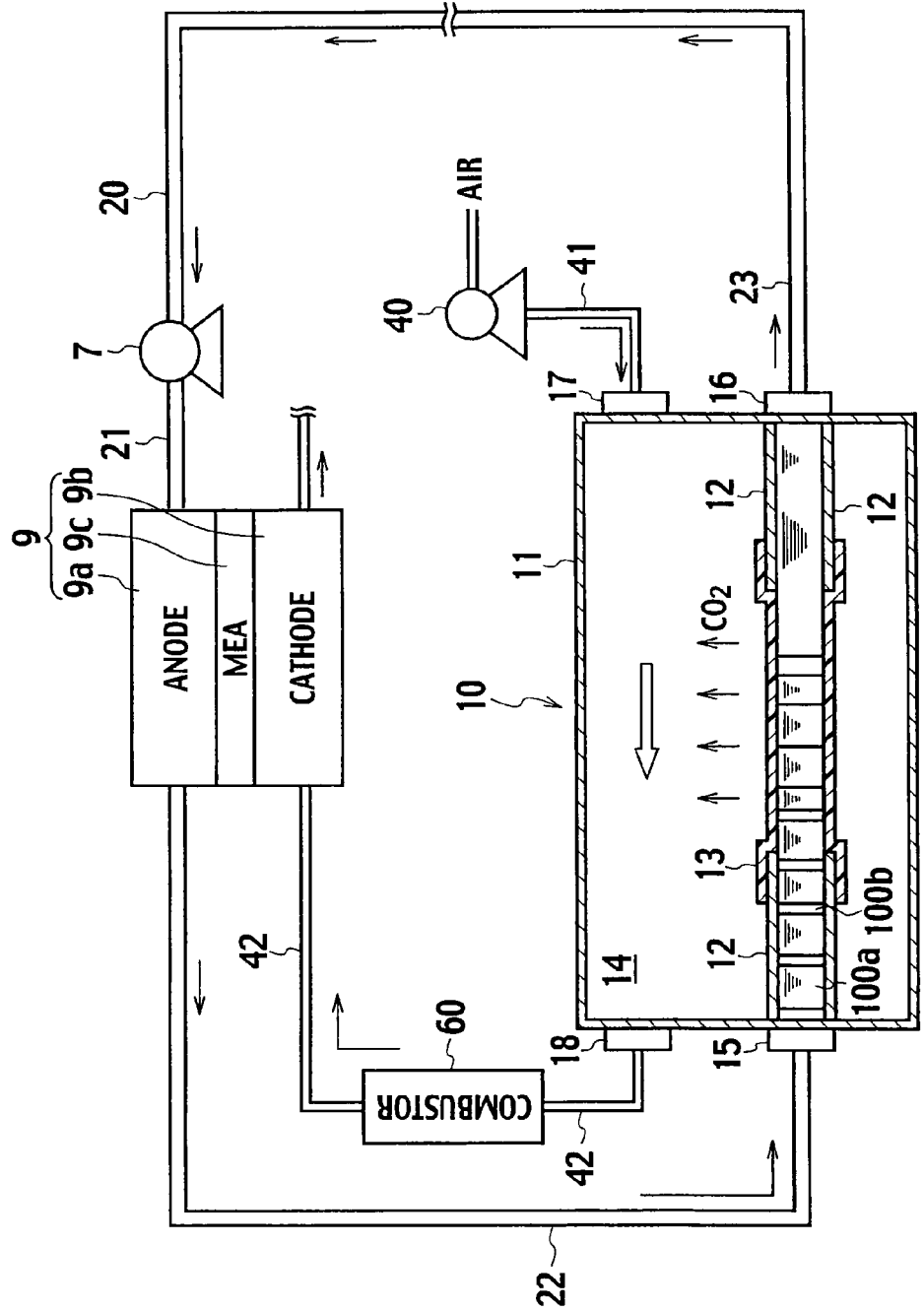
FIG. 3 is an explanation diagram illustrating an example of a fuel cell system according to a first modification of the first embodiment.

As shown in FIG. 3, a fuel cell system (gas-liquid separation system) according to a first modification of the first embodiment includes: a pipe (pipe route) 42 that supplies the gas, which is discharged from the gas outlet 18, to the cathode 9b; and a combustor 60 provided on the pipe 42. As the combustor 60, for example, usable is a catalyst combustion device in which a decomposition catalyst is supported on the air passage through which the gas discharged from the gas outlet 18 flows, or the like. Others are substantially similar to those in the example shown in FIG. 2, and accordingly, a description thereof will be omitted.

In accordance with the fuel cell system shown in FIG. 3, the gas can be fed to the cathode 9b by using the pump 40 for feeding the air into the spatial region 14. Accordingly, the air feed pump 4 (refer to FIG. 1) for feeding the air to the cathode 9b can be omitted, and the system can be simplified and miniaturized.

Second Modification

Figure 4:
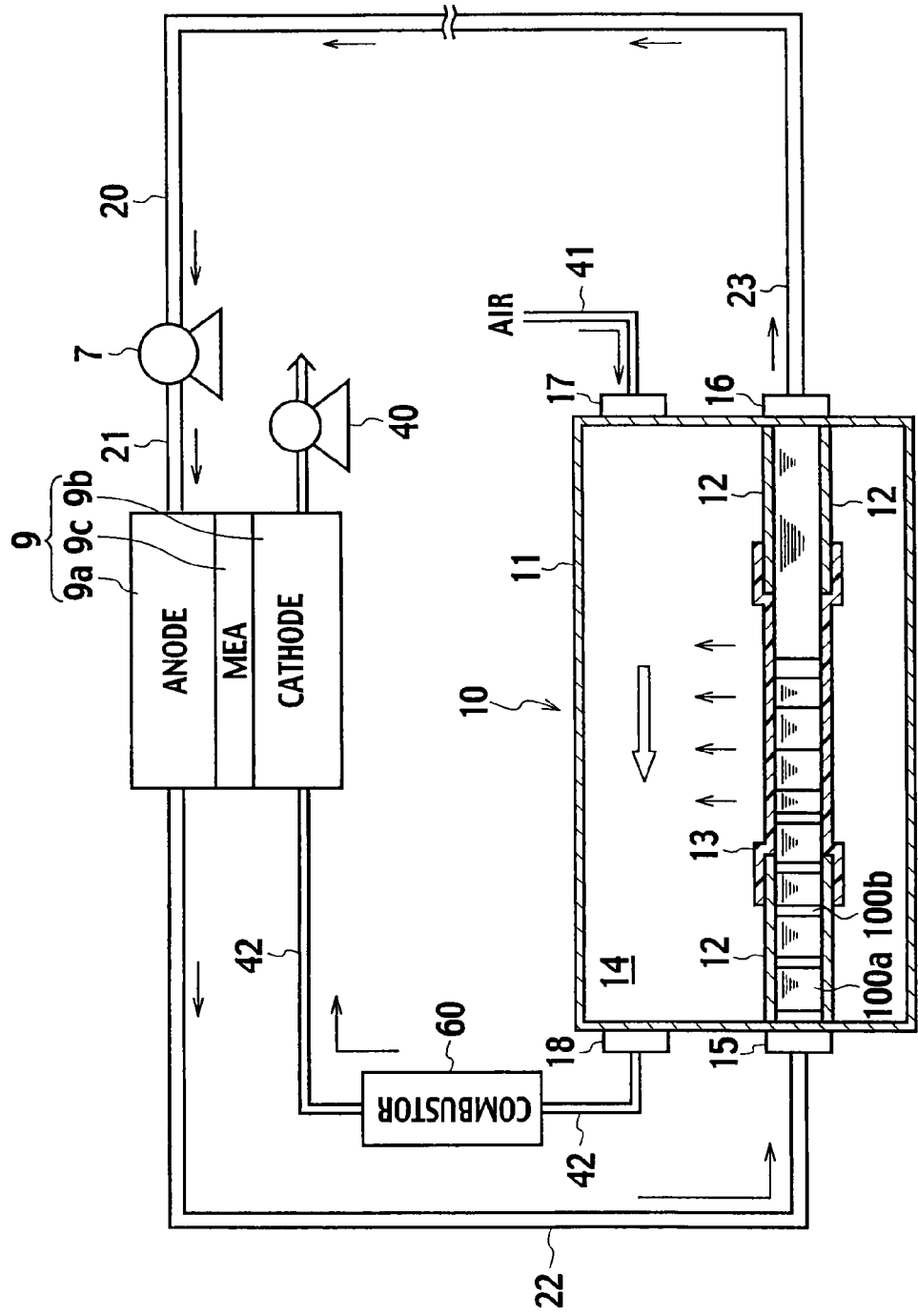
FIG. 4 is an explanation diagram illustrating an example of a fuel cell system according to a second modification of the first embodiment.

As shown in FIG. 4, a fuel cell system (gas-liquid separation system) according to a second modification of the first embodiment is different from the systems shown in FIG. 2 and FIG. 3 in that the pump 40 is connected to a downstream side of the gas outlet 18 of the gas-liquid separator 10, that is, to a downstream side of the cathode 9b. In this case, as the pump 40, a pump of a type that permits entrance of the steam is used. Others are substantially similar to those in the example shown in FIG. 3.

In accordance with the fuel cell system shown in FIG. 4, the pump 40 connected to the downstream side of the cathode 9b sucks the gas in the spatial region 14. Accordingly, in comparison with the example of FIG. 3, a pressure difference between the pressure in the spatial region 14 and the inner pressure of the separation pipe 12 can be increased. As the pressure difference is being larger, the gas in the separation pipe 12 is more likely to flow out to the spatial region 14 through the separation membrane 13. Therefore, in comparison with the example of FIG. 3, a gas-liquid separation capability of the gas-liquid separator 10 can be enhanced.

Third Modification

Figure 5:
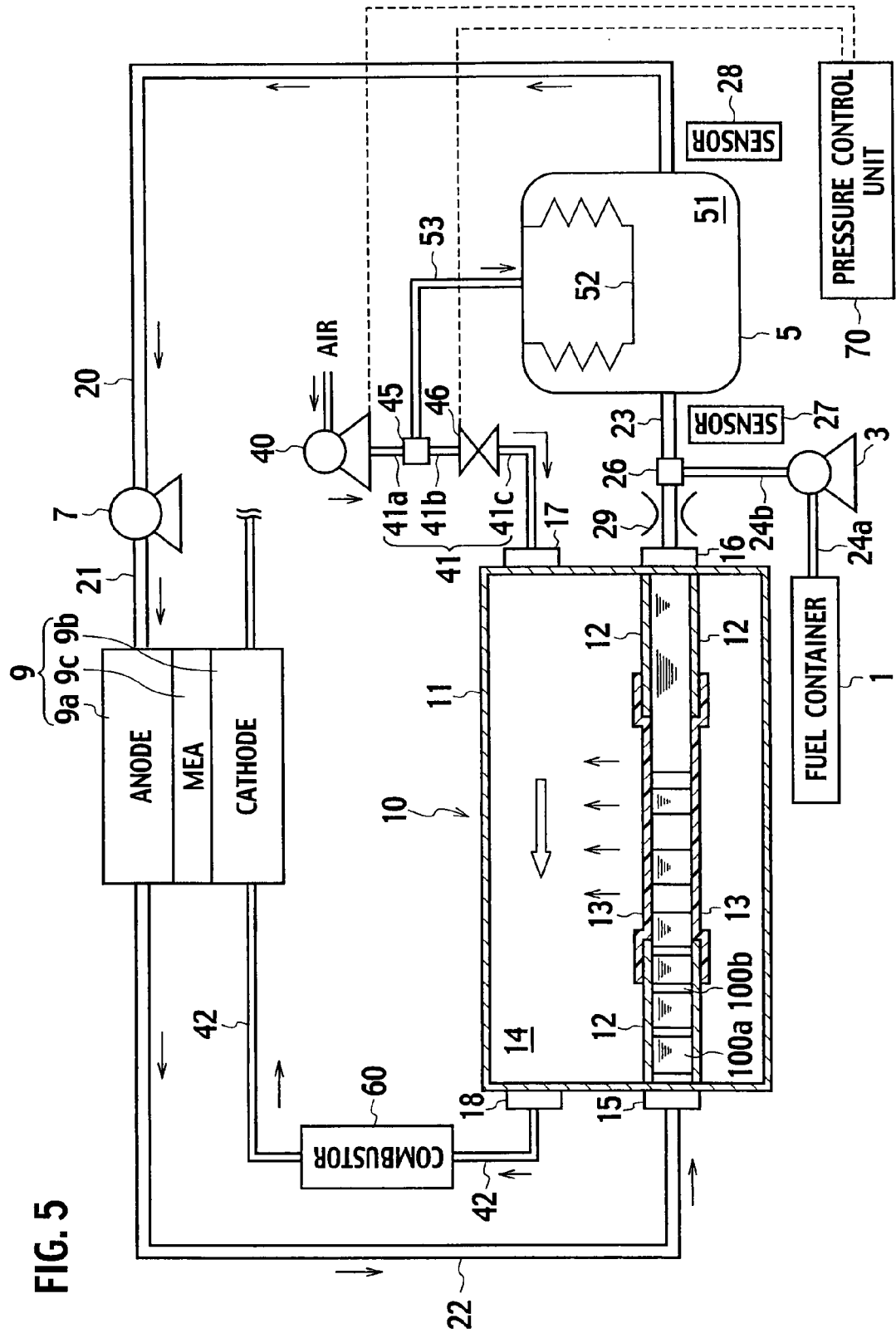
FIG. 5 is an explanation diagram illustrating an example of a fuel cell system according to a third modification of the first embodiment.

As shown in FIG. 5, a fuel cell system (gas-liquid separation system) according to a third modification of the first embodiment includes: a valve 46 that shuts off the flow of the gas into the spatial region 14; a fuel tank 5 (liquid housing portion 51) connected to the separation pipe 12; a freely expand able-contractible bag 52 disposed in the liquid housing portion 51 and connected to the pump 40; and a pressure control unit 70 that houses the liquid 100a present in the separation pipe 12 into the liquid housing portion 51 by a valve 46 and the pump 40.

The valve 46 is connected to a pipe 41c connected to the upstream side of the gas inlet 17. A branching member 45 is connected to a pipe 41b connected to an upstream side of the valve 46. An upstream side of the branching member 45 is connected through a pipe 41a to the pump 40. The branching member 45 is connected to a pressure conduit 53.

The pipe 23 that connects the separation pipe 12 and the liquid housing portion 51 to each other includes a branching member 26. The high-concentration fuel in the fuel container 1 is supplied by the pump 3 through pipes 24a and 24b connected to the branching member 26.

A resin-made bellows or the like is suitable as the bag 52. The bag 52 is connected to the pressure conduit 53, and is capable of housing the air fed from the pump 40 through the pressure conduit 53. Moreover, the bag 52 is pressurized through the pressure conduit 53 by a discharge pressure of the pump 40, and is controlled so as not to be flattened by a pressure of the liquid in the liquid housing portion 51.

In FIG. 5, the pump 40 for supplying the gas into the spatial region 14 is utilized in order to apply a pressure into the bag 52, whereby the system is simplified. However, if an air supply capability of the pump 40 is insufficient, then pressure applying member (not shown) for applying the pressure into the bag 52 may be provided separately.

The pressure control unit 70 is electrically connected to the pump 40 and the valve 46. The pressure control unit 70 realizes a "removal mode" for removing the liquid from the inside of the separation pipe 12 placed in the gas-liquid separator 10 when the power is not generated by the electromotive unit 9.

Figure 6:
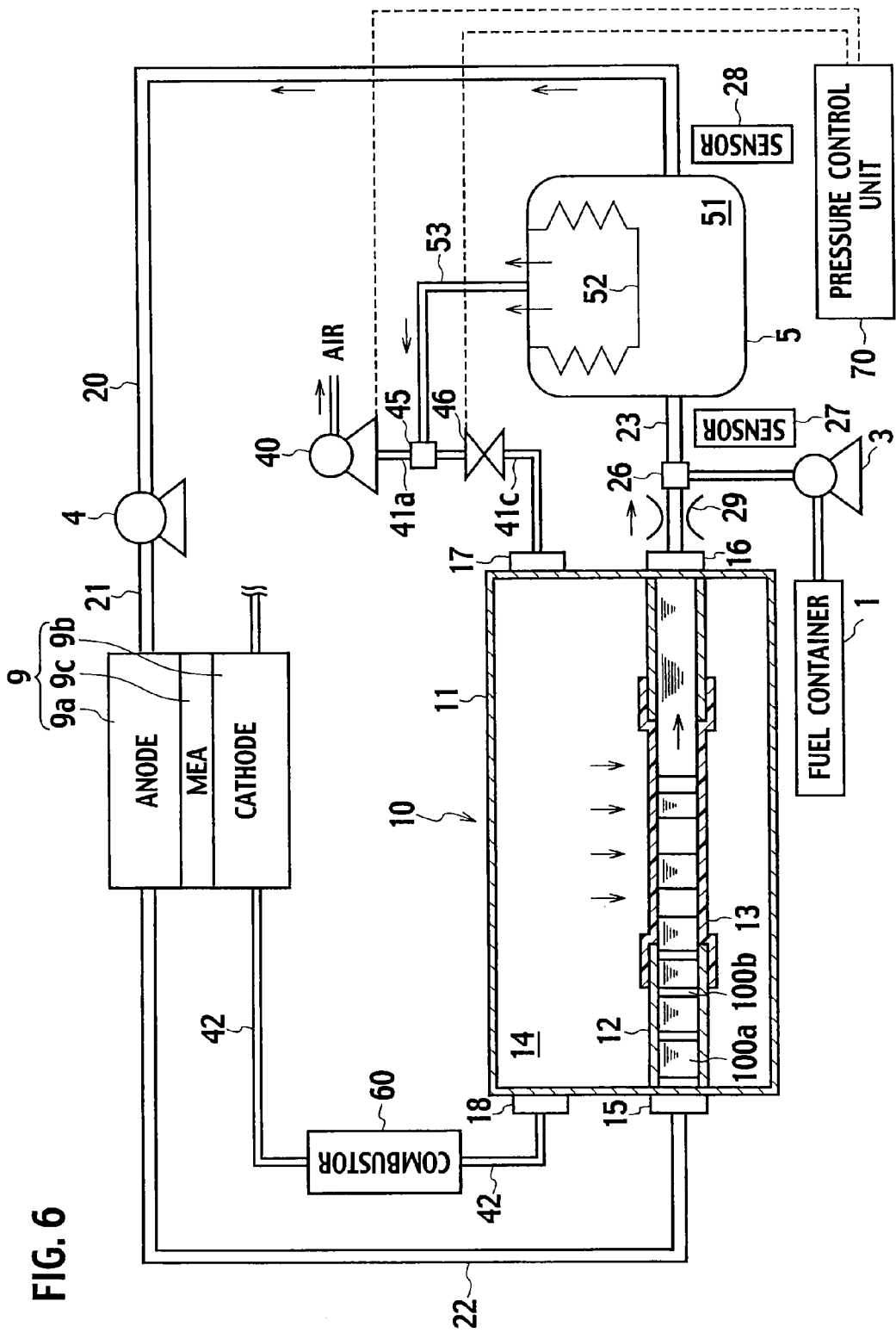
FIG. 6 is an explanation diagram illustrating an example of a fuel cell system according to the third modification of the first embodiment.

The "removal mode", as shown in FIG. 6 for example, refers to a mode where the pressure control unit 70 closes the valve 46, reverses the pump 40, and thereby contracts the bag 52 when the power stops being generated in the electromotive unit 9 and the fluid comes not to be newly introduced into the gas-liquid separator 10. By the fact that the bag 52 is contracted, an amount of the liquid capable of being housed in the liquid housing portion 51 is increased. The fuel passage composed of the pipes 20, 21, 22 and 23 is formed into a closed-loop structure. Accordingly, by the fact that the bag 52 is contracted, a pressure in the liquid housing portion 51 is reduced, and the liquid in the separation pipe 12 is drawn into the liquid housing portion 51. As a result, the gas in the spatial region 14, which has permeated the separation membrane 13, is drawn into the separation pipe 12, and the liquid in the inside of the gas-liquid separator 10 is removed. Accordingly, even if the electromotive unit 9 stops generating the power, the condensation in the gas-liquid separator 10 can be suppressed, which is caused by the fact that the liquid remaining in the gas-liquid separator 10 evaporates.

Note that pressure reduction member (orifice) 29 may be connected to the pipe 23 which is connected to the outlet 16. The pressure reduction member 29 is connected to the pipe 23, whereby a pressure difference between the inner pressure of the liquid housing portion 51 and the inner pressure of the separation pipe 12 can be increased more. Moreover, the pressure reduction member 29 is provided, whereby the inner pressure of the separation pipe 12 can be made further larger than the inner pressure of the spatial region 14. Accordingly, the gas-liquid separation capability is enhanced more.

For the purpose of sensing bubbles in the fluid that flows through the pipes 20 and 23, for example, there may be arranged bubble detection sensors (first sensor 27, second sensor 28) which optically detect the bubbles by irradiating infrared rays and the like onto the pipes 20 and 23. The first and second sensors 27 and 28 are arranged, whereby the gas-liquid separation capability of the gas-liquid separator 10 can be monitored. Accordingly, it can be made easy to control the power generation capability (an amount of output power) of the electromotive unit 9. Moreover, a configuration may be adopted, in which, in response to detection results of the first and second sensors 27 and 28, the pressure control unit 70 contracts the bag 52, and adjusts the pressure in the liquid housing portion 51.

In accordance with the fuel cell system according to the third modification, when the power generation performed by the electromotive unit 9 is stopped, the pressure control unit 70 operates the "removal mode" of removing the liquid in the gas-liquid separator 10, whereby the liquid in the gas-liquid separator 10 can be housed in the fuel tank 5. Therefore, when the gas-liquid separator 10 is not operated, the condensation caused by the liquid remaining in the gas-liquid separator 10 can be suppressed.

Moreover, the pressure control unit 70 controls the expansion and contraction of the bag 52, and varies a buffer amount of the liquid housed in the liquid housing portion 51. In such a way, for example, even if a volume of the $CO_2$ bubbles generated in the anode 9a is changed in response to an operation status of the fuel cell system, a shortage of the fuel and an increase of the pressure in such an anode passage can be suppressed from occurring, and a fuel cell system that is stably operatable can be provided.

Note that a liquid housing amount (variable buffer amount) of the liquid housing portion 51, which is changed by the expansion and contraction of the bag 52, is preferably larger than a total capacity of the passage from the inlet of the anode 9a to the inlet of the separation pipe 12. In such a way, the fuel can be stably supplied to the anode 9a.

Second Embodiment

Figure 7:
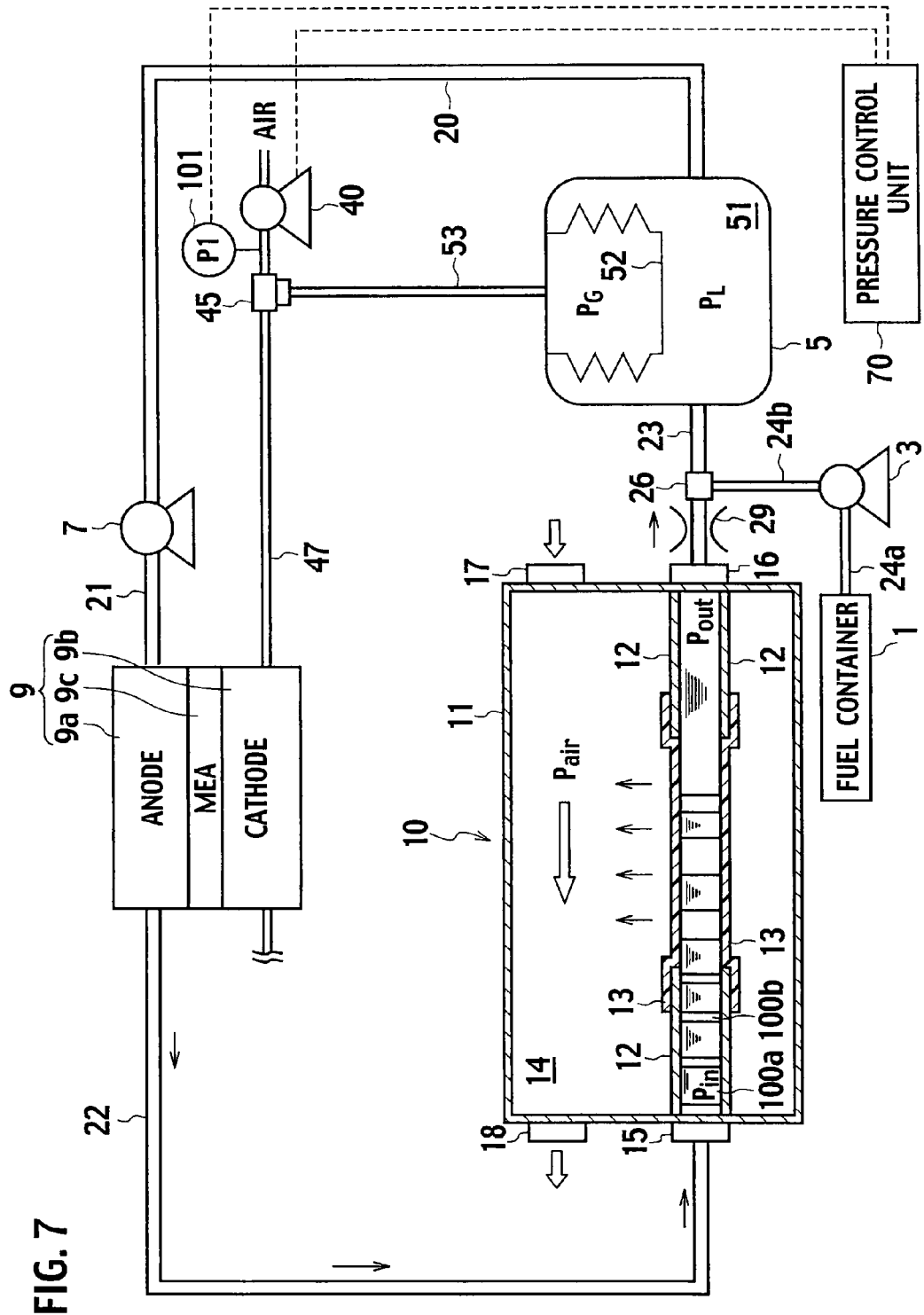
FIG. 7 is an explanation diagram illustrating an example of a fuel cell system according to a second embodiment.

As shown in FIG. 7, a fuel cell system (gas-liquid separation system) according to a second embodiment includes: the electromotive unit 9 having the anode 9a and the cathode 9b; the gas-liquid separator 10 that separates the gas-liquid mixed fluid, which is fed from the anode 9a, into the gas and the liquid; the fuel-storing fuel tank 5 for circulating a fuel to the anode 9a, including the liquid discharged from the gas-liquid separator 10, the fuel tank 5 being connected to the gas-liquid separator 10; the freely expand able-contractible bag 52 disposed in the fuel tank 5; the pump (pressurization pump) 40 that applies the pressure into the bag 52 and adjusts the inner pressure of the fuel tank 5; and the control unit 70 that controls the discharge pressure of the pump 40.

The pump 40 is connected to a pipe (pipe route) 47 connected to the cathode 9b. The pipe 47 includes the branching member 45. The branching member 45 is connected to the pressure conduit 53 connected to the bag 52. The bag 52 is maintained at a pressure $P_G$ by the pump 40 and the pressure conduit 53 so as not to be flattened by a pressure $P_L$ in the liquid housing portion 51.

In FIG. 7, as the gas-liquid separator 10, a device is illustrated, which includes: the housing 11 in which the gas inlet 17 and the gas outlet 18 are provided; the separation pipe 12 that is housed in the housing 11 and is connected to the liquid housing portion 51 of the fuel tank 5; and the separation membrane 13 provided in the separation pipe 12. However, a gas-liquid separator of another type in which the gas-liquid separation by the separation membrane 13 is not performed may be used.

Note that, in FIG. 7, since the spatial region 14 is open to the atmosphere through the gas inlet 17 and the gas outlet 18, a pressure $P_{air}$ in the spatial region 14 is substantially equivalent to the atmospheric pressure. A pressure gauge 101 for measuring the discharge pressure $P_a$ of the pump 40 may be connected to the pipe 47. The pressure control unit 70 controls the discharge pressure of the pump 40, and changes a state where the pressure is applied into the bag 52, thereby expands and contracts the bag 52, and changes a physical state (volume, pressure) of the liquid housing portion 51 that houses the bag 52.

In general, in the case of performing the gas-liquid separation by using the pressure difference, the gas-liquid separation capability is enhanced more as the pressure difference is being larger. Accordingly, it is preferable that the inner pressure ($P_{in}$, $P_{out}$) of the separation pipe 12 be set higher than the pressure $P_{air}$ in the spatial region 14. Moreover, when the inner pressure of the fluid that flows through the inlet 15 of the separation pipe 12 is defined as $P_{in}$, and the inner pressure of the fluid that flows through the outlet 16 on the downstream side is defined as $P_{out}$, the gas-liquid separation capability is enhanced more as a pressure difference $\Delta P$ ($=P_{in}-P_{out}$) between the inner pressure $P_{in}$ and the inner pressure $P_{out}$ is being increased.

In accordance with the fuel cell system shown in FIG. 7, for example, the discharge pressure of the pump 40 is controlled by the pressure control unit 70, and the pressure $P_G$ and volume of the bag 52 is changed, whereby the physical state (pressure $P_L$ and volume) of the liquid housing portion 51 that houses the bag 52 is changed. For example, the pressure $P_G$ in the bag 52 is increased by using the pump 40, whereby the pressure $P_L$ in the liquid housing portion 51 is also increased, and accordingly, the difference between the inner pressure $P_{out}$ of the fluid that flows through the outlet 16 of the separation pipe 12 and the pressure $P_{air}$ of the fluid in the spatial region 14 is increased. In such a way, the gas-liquid separation capability can be enhanced.

Moreover, the pressure reduction member 29 is provided on the pipe 23 placed between the outlet 16 and the liquid housing portion 51, whereby a pressure difference of the fluid between the upstream side and downstream side of the pressure reduction member 29 can be increased more. Accordingly, the difference between the inner pressure $P_{in}$ (or $P_{out}$) and the pressure $P_{air}$ of the fluid in the spatial region 14 is increased more, and the gas-liquid separation capability can be further enhanced.

First Modification

Figure 8:
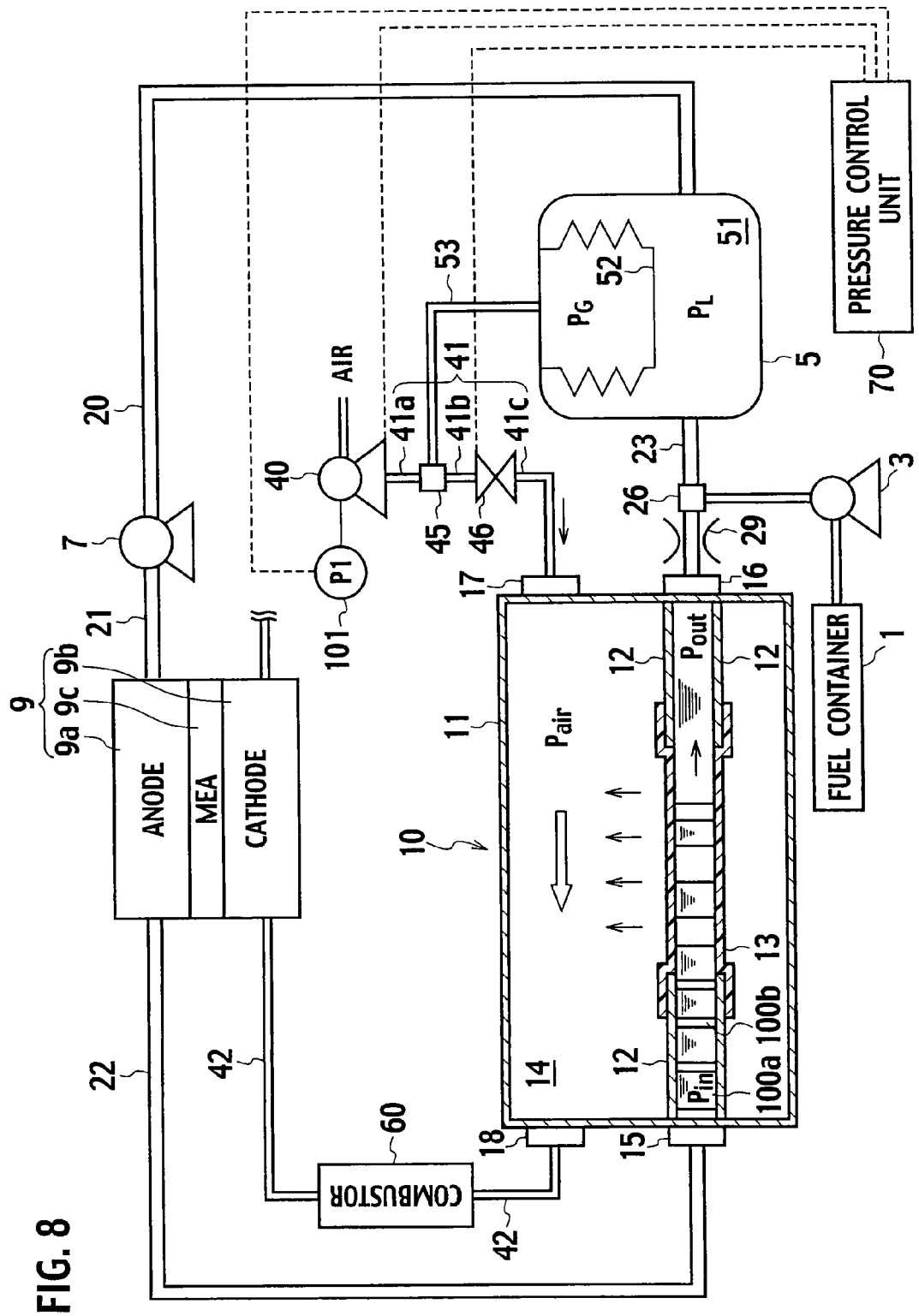
FIG. 8 is an explanation diagram illustrating an example of a fuel cell system according to a first modification of the second embodiment.

As shown in FIG. 8, a fuel cell system (gas-liquid separation system) according to a first modification of the second embodiment includes: the pipe (pipe route) 41 that is connected between the pump 40 and the gas-liquid separator 10 and feeds the gas, which is discharged by the pump 40, into the spatial region 14; the branching member 45 provided on the pipe 41; the pressure conduit 53 in which one end is connected to the branching member 45, and the other end is connected to the bag 52; and the pressure reduction member 29 connected to the pipe 23 placed between the separation pipe 12 and the liquid housing portion 51.

The pipe 41 includes: the pipe 41a; the pipe 41b; and the pipe 41c. The branching member 45 is provided between the pipe 41a and the pipe 41b. The pressure is applied into the bag 52, which is connected to the pressure conduit 53, by the pump 40 through the pressure conduit 53, and the bag 52 is set so as not to be flattened. Note that a configuration may be adopted, in which a pressure gauge (not shown) for measuring the pressure $P_L$ in the liquid housing portion 51 is provided in the fuel tank 5, and the pressure control unit 70 controls the discharge pressure of the pump 40 in response to a pressure change of the pressure $P_L$. The valve 46 is connected between the pipe 41b and the pipe 41c.

The pressure gauge 101 for measuring the discharge pressure of the pump 40 may be connected thereto. The pressure control unit 70 controls the discharge pressure of the pump 40 by using the pressure gauge 101, and controls opening and closing of the valve 46. The pressure reduction member (orifice) 29 is connected to the pipe 23, and reduces the pressure of the liquid that flows through the pipe 23. Others are substantially similar to those in the examples shown in FIG. 5 and FIG. 6.

When the discharge pressure of the pump 40 is defined as $P_a$, the pressure $P_{air}$ in the spatial region 14 becomes a pressure ($P_{air} = P_a - \Delta P1$) obtained by subtracting, from the discharge pressure $P_a$ of the pump 40, a pressure loss $\Delta P1$ when the fluid passes through the pipe 41a, the branching member 45, the pipe 41b, the valve 46 and the pipe 41c. Meanwhile, the inner pressure $P_{out}$ of the separation pipe 12 becomes a pressure ($P_{out} = P_a - \Delta P2 + \Delta P3 + \Delta P4 + \Delta P5$) obtained by adding a pressure difference ($\Delta P3$) between the pressure $P_G$ Of the bag 52 and the pressure $P_L$ of the liquid housing portion 51, a pressure loss ($\Delta P4$) when the fluid passes through the pipe 23 and a pressure ($\Delta P5$) reduced by the pressure reduction member 29 to a pressure obtained by subtracting, from the discharge pressure $P_a$ of the pump 40, a pressure loss ($\Delta P2$) when the fluid passes through the pipe 41a, the branching member 45 and the pressure conduit 53.

Values of the pressure loses can be obtained in advance by calculation. Accordingly, based on the values of the pressure losses of the pipe 41, the branching member 45, the valve 46, the pressure conduit 53, the bag 52, the pipe 23, the branching member 26 and the pressure reduction member 29, the pressure control unit 70 may control the pump 40 and the valve 46, for example, so that a pressure difference ($P_{air} - P_{out}$) between the $P_{air}$ in the spatial region 14 and the inner pressure $P_{out}$ on the downstream side of the separation pipe 12 can be a fixed value or more, thereby controlling the gas-liquid separation capability of the gas-liquid separator 10.

In the fuel cell system shown in FIG. 8, for example, a case is assumed, where the pressure losses in the pipes 23 and 41, the branching members 26 and 45, the pressure conduit 53, the valve 46, the bag 52 and the liquid housing portion 51 are ignored, the pressure of the air is 0 kPa, and the inner pressure $P_{in}$ on the upstream side of the separation pipe 12 of the gas-liquid separator 10 is 4.2 kPa. A description will be made below of numeric value examples of the pressures in the above-described respective regions in such a case.

The inner pressure $P_{out}$ on the downstream side of the separation pipe 12 becomes lower than the inner pressure $P_{in}$ since the gas flows, through the separation membrane 13, out of the fluid that flows through the inside of the separation pipe 12. Accordingly, when the inner pressure $P_{in}$ on the upstream side of the separation pipe 12 is 4.2 kPa, the inner pressure $P_{out}$ becomes, for example, 3.6 kPa. The pressure of the fluid that has flown out of the separation pipe 12 through the outlet 16 is further reduced by the pressure reduction member 29. When a pressure reduction capability of the pressure reduction member 29 is 1.4 kPa, the pressure $P_L$ in the liquid housing portion 51 connected to the downstream side of the pipe 23 becomes 2.2 kPa (3.6−1.4). Here, if the discharge pressure of the pump 40 is set at 2.2 kPa by the pressure control unit 70, and the valve 46 is adjusted to the open state thereby, for example, so that the pressure $P_L$ can be substantially equal to the pressure $P_G$, then the pressure $P_{air}$ in the spatial region 14 becomes 2.2 kPa. As described above, in accordance with the configuration shown in FIG. 8, the inner pressure $P_{in}$ of the separation pipe 12 becomes 3.6 kPa, and the pressure $P_{air}$ in the spatial region 14 becomes 2.2 kPa, whereby the pressure difference can be provided between the inner pressure $P_{in}$ of the separation pipe 12 and the pressure $P_{air}$ in the spatial region. Accordingly, the gas-liquid separation capability is enhanced more.

Note that, when the pressure control unit 70 controls the opening-closing state of the valve 46, thereby increasing the pressure loss of the fluid that flows from the pipe 41b to the pipe 41c, the pressure difference between the $P_{air}$ in the spatial region 14 and the inner pressure $P_{out}$ in the vicinity of the outlet 16 of the separation pipe 12 can be increased more. Accordingly, the gas liquid separation capability of the gas-liquid separator 10 can be further enhanced.

Second Modification

Figure 9:
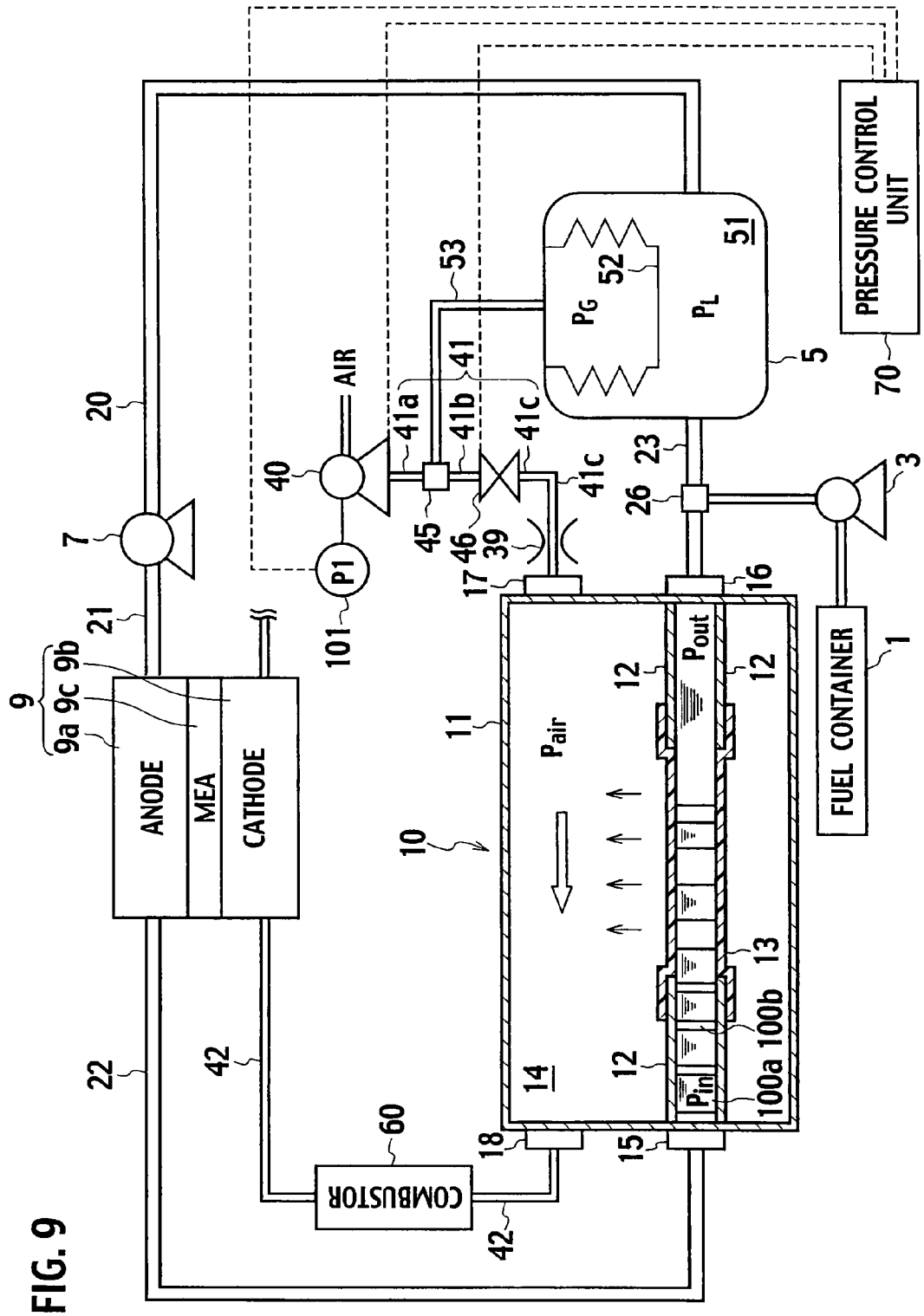
FIG. 9 is an explanation diagram illustrating an example of a fuel cell system according to a second modification of the second embodiment.

As shown in FIG. 9, a fuel cell system (gas-liquid separation system) according to a second modification of the second embodiment is different from the fuel cell system shown in FIG. 8 in that there is further provided pressure reduction member (orifice) 39 connected to the pipe 41c that connects the branching member 45 and the gas-liquid separator 10 to each other. Others are substantially similar to those of the fuel cell system shown in FIG. 8.

In accordance with the fuel cell system shown in FIG. 9, the pressure of the gas fed from the pump 40 is reduced by the pressure reduction member 39, whereby the pressure $P_{air}$ of the gas fed into the spatial region 14 is reduced. Accordingly, in comparison with the case where the pressure reduction member 39 is not disposed, the pressure difference between the pressure $P_{air}$ and the inner pressure ($P_{in}$, $P_{out}$) of the separation pipe 12 can be maintained to be larger, and the gas-liquid separation capability can be enhanced. Moreover, the gas is flown in the spatial region 14 by the pump 40, whereby the condensation in the gas-liquid separator 10 can also be suppressed.

Third Modification

Figure 10:
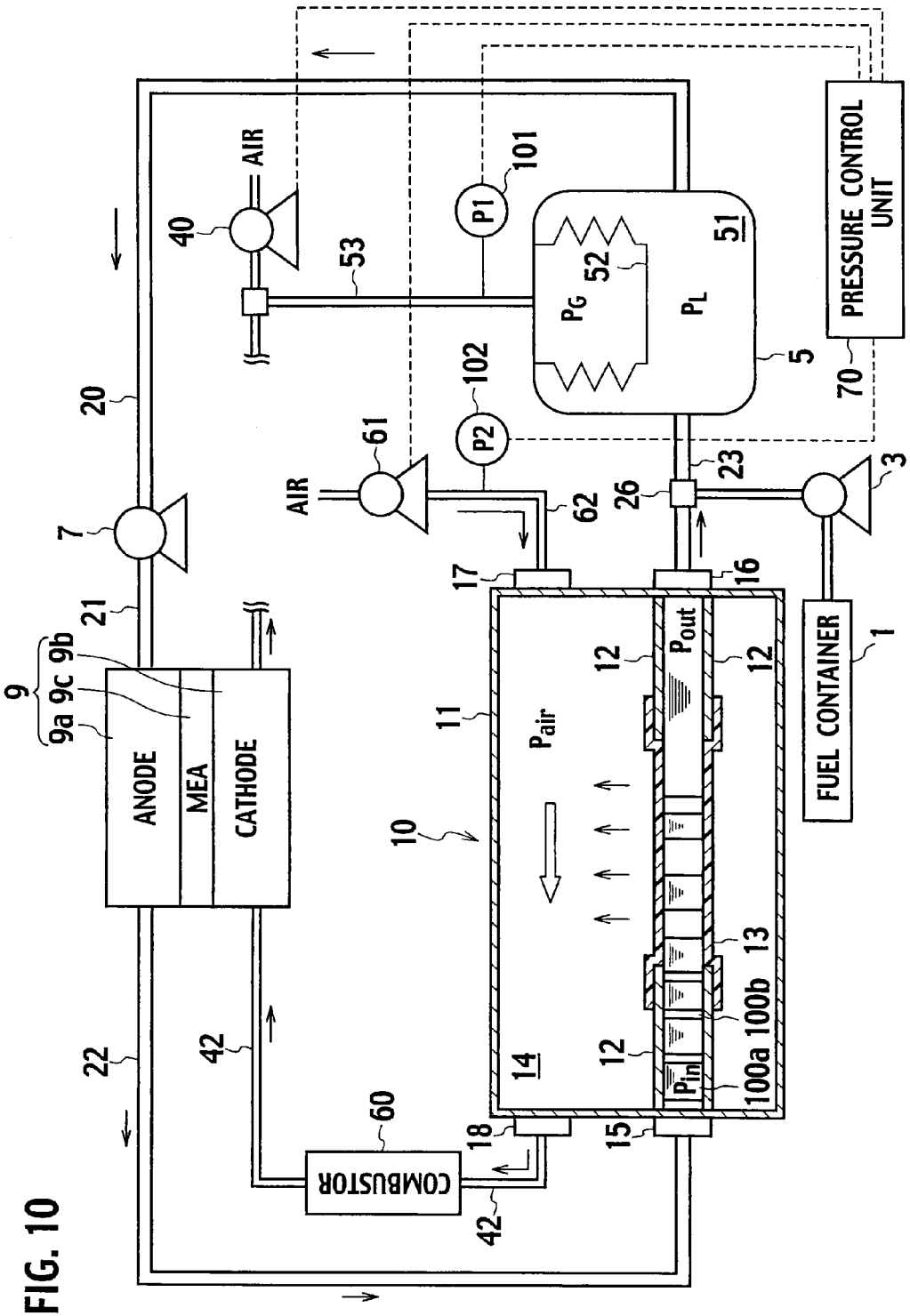
FIG. 10 is an explanation diagram illustrating an example of a fuel cell system according to a third modification of the second embodiment.

As shown in FIG. 10, a fuel cell system (gas-liquid separation system) according to a third modification of the second embodiment includes: the pressure conduit 53 connected between the pump 40 and the bag 52; an air feed pump 61 that feeds, to the spatial region 14, the gas in the outside of the gas-liquid separator 10; and a pipe 62 that is connected to the air feed pump 61 and feeds the gas, which is discharged by the air feed pump 61, into the spatial region 14. The pressure gauge 101 for measuring the discharge pressure of the pump 40 is connected to the pressure conduit 53. A pressure gauge 102 for measuring a discharge pressure of the air feed pump 61 is connected to the pipe 62. The pressure control unit 70 controls the discharge pressures of the pump 40 and the air feed pump 61 so that the inner pressure $P_{out}$ on the outlet 16 side of the separation pipe 12 can be higher than the pressure $P_{air}$ in the spatial region 14. Others are substantially similar to those in the example shown in FIG. 7.

In accordance with the fuel cell system shown in FIG. 10, the gas in the outside of the gas-liquid separator 10 is supplied to the spatial region 14 by the air feed pump 61, whereby the condensation in the gas-liquid separator 10 is suppressed. Simultaneously, the discharge pressures of the air feed pump 61 and the pump 40 are controlled by the pressure control unit 70, whereby the pressure difference between the pressure $P_{air}$ and the inner pressure ($P_{in}$, $P_{out}$) of the separation pipe 12 can be maintained to be larger. Accordingly, the gas-liquid separation capability can be enhanced more.

Fourth Modification

Figure 11:
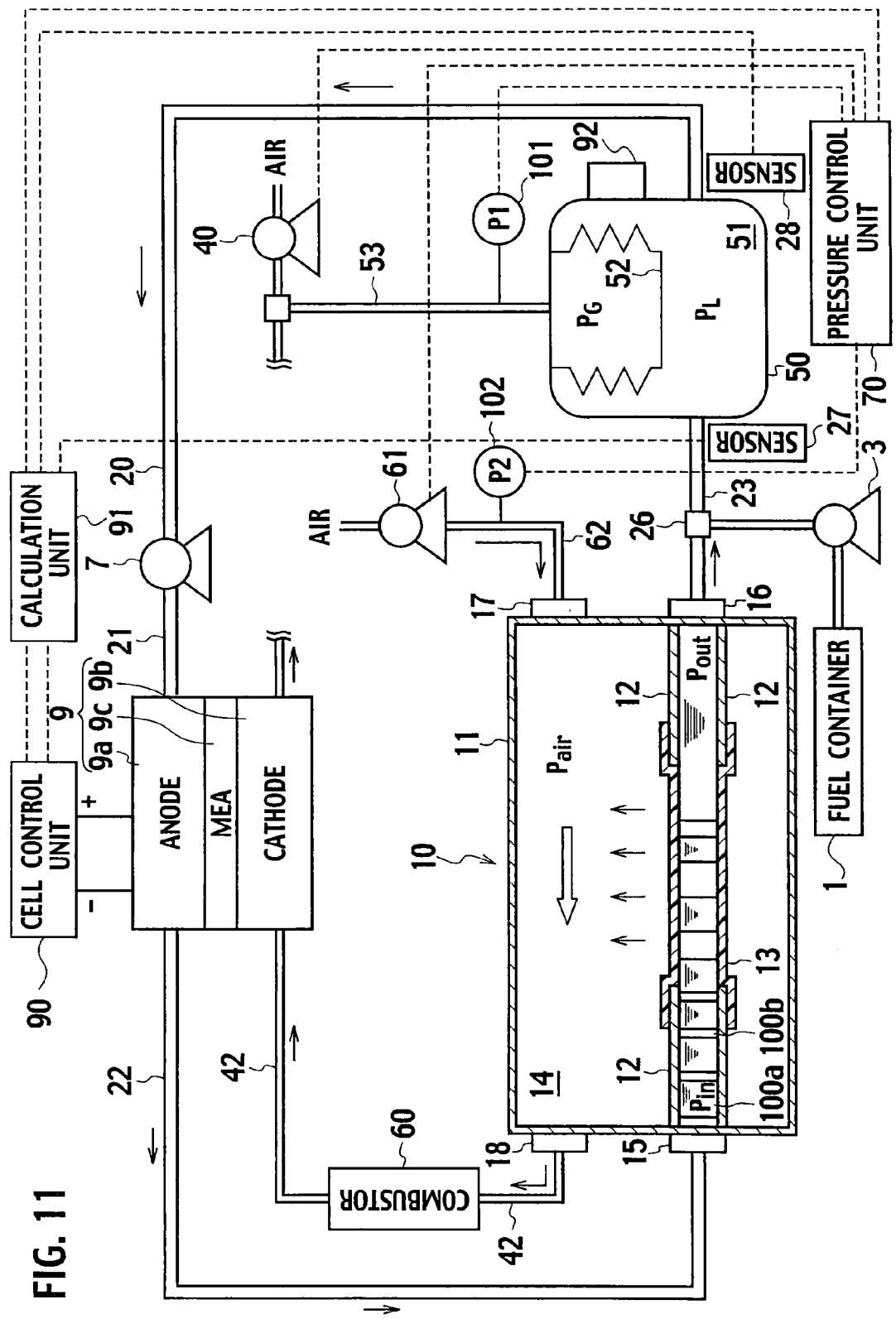
FIG. 11 is an explanation diagram illustrating an example of a fuel cell system according to a fourth modification of the second embodiment of the present invention.

As shown in FIG. 11, a fuel cell system (gas-liquid separation system) according to a fourth modification further includes: the first sensor 27 that senses the bubbles in the fluid flowing through the pipe 23; the second sensor 28 that senses the bubbles in the fluid flowing through the pipe 20; and a calculation unit 91 that calculates a bubble amount and a liquid amount in the fuel tank 5 based on detection results of the first sensor 27 and the second sensor 28.

As the first sensor 27 and the second sensor 28, for example, sensors which optically detect the bubbles in the fluid by irradiating the infrared rays and the like onto the pipes 20 and 23 are suitable. The calculation unit 91 calculates a difference between a bubble amount detected by the first sensor 27 and a bubble amount detected by the second sensor 28, and calculates the amounts of bubbles and liquid which are housed in the liquid housing portion 51 of the fuel tank 5.

The calculation unit 91 is connected to a cell control unit 90 which is connected to the electromotive unit 9. The cell control unit 90 controls an amount of output power of the electromotive unit 9 based on calculation results of the bubble amounts calculated by the calculation unit 91 or on a detection result of the bubbles by the second sensor 28. For example, upon determining that the amount of bubbles discharged continuously from the fuel tank 5 has exceeded a predetermined value during the operation of the fuel cell system based on such a detected value by the second sensor 28, the cell control unit 90 can reduce the amount of output power (power generation capability) of the electromotive unit 9 for a predetermined time.

Moreover, an inclination sensor 92 for detecting an inclined state of the fuel tank 5 may be provided on the fuel tank 5. In addition, the cell control unit 90 may control the power generation capability of the electromotive unit 9 based on a detection result by the inclination sensor 92. For example, during the period while the fuel cell system is being operated, when a detected value by the inclination sensor 92 is within a predetermined range, and when it is determined that the amount of liquid discharged continuously from the fuel tank 5 has exceeded a predetermined value based on the detected values of the bubbles by the first sensor 27 and the second sensor 28, the cell control unit 90 may control the electromotive unit 9 to be operated.

In accordance with the fuel cell system shown in FIG. 11, the first sensor 27 and the second sensor 28 are provided, whereby the bubbles left after the removal thereof by the gas-liquid separator 10 are sensed. The cell control unit 90 can control the amount of output power of the electromotive unit 9 based on the calculation results of the bubble amounts by the calculation unit 91. Accordingly, the power generation capability of the electromotive unit 9 can be controlled to be increased and reduced in response to a state where the bubbles enter the anode 9a, and the fuel cell system can be operated more stably. Note that, naturally, the first and second sensors 27 and 28, the inclination sensor 92 and the calculation unit 91, which are shown in FIG. 11, are also applicable to the fuel cell systems described with reference to FIG. 1 to FIG. 10.

Various modifications will become possible for those skilled in the art after receiving the teachings of the present disclosure without departing from the scope thereof.

What is claimed is:

1. A gas-liquid separation system comprising:
a housing having a gas inlet and a gas outlet;
a separation pipe contained in the housing;
a separation membrane provided in the separation pipe;
a pump configured to suck a gas from an outside of the housing, to supply the gas into the housing through the gas inlet, and to exhaust the gas from the housing through the gas outlet;
a valve provided on an upstream side of the gas inlet, configured to shut off a supply of the gas;
a liquid housing portion connected to the separation pipe; a bag connected to the pump and provided in the liquid housing portion; and
a pressure control unit configured to control a pressure in the liquid housing portion by closing the valve and contracting the bag, and store a liquid in the liquid housing portion, the liquid present in the separation pipe.

2. The system of claim 1, wherein the pump is connected to an upstream side of the gas inlet.

3. The system of claim 1, wherein the separation membrane includes a porous membrane made of hydrophobic polytetrafluoroethylene formed into a tube shape.

4. The system of claim 1, further comprising a pressure reduction member provided between the separation pipe and the liquid housing portion.

5. The system of claim 1, wherein the bag includes a bellows.

6. The system of claim 1, further comprising:
a branching member provided in a pipe route connecting the pump and the gas inlet;
a valve provided in the pipe route between the branching member and the gas inlet; and
a pressure conduit in which one end is connected to the branching member and the other end is connected to the bag.

7. A fuel cell system comprising:
an electromotive unit including an anode and a cathode;
a gas-liquid separator connected to the anode, including
a housing at which a gas inlet and a gas outlet are provided,
a separation pipe contained in the housing; and
a separation membrane provided in the separation pipe;
a pump configured to suck a gas from an outside of the housing, to supply the gas into the housing through the gas inlet, and to exhaust the gas from the housing though the gas outlet;
a fuel tank storing a fuel including a liquid discharged from the separation pipe, the fuel being circulated to the anode;
a valve provided on an upstream side of the gas inlet;
a bag connected to the pump and disposed in the fuel tank; and
a pressure control unit configured to control a pressure in the fuel tank by closing the valve and contracting the bag, and store a liquid in the separation pipe into the fuel tank, based on an operation status of the gas-liquid separator.

8. The system of claim 7, wherein the separation pipe includes a porous membrane made of hydrophobic polytetrafluoroethylene.

9. The system of claim 7, wherein the bag includes a bellows.

10. The system of claim 7, wherein the pressure control unit turns the valve to a closed state and allows the pump to suck gas in the bag, and reduces a pressure in the fuel tank, when the electromotive unit stops generating power.

11. The system of claim 7, wherein a variable buffer amount of the fuel tank, the variable buffer amount being changed by expansion and contraction of the bag, is larger than a total capacity of a passage from an inlet of the anode to an inlet of the separation pipe.

12. The system of claim 7, further comprising:
a branching member provided in a pipe route connecting the pump and the gas inlet;
a valve provided in the pipe route between the branching member valve and the gas inlet; and
a pressure conduit in which one end is connected to the branching member and the other end is connected to the bag.

13. The system of claim 7, further comprising:
a branching member provided in a first pipe route connecting the pump and the gas inlet;
a pressure conduit in which one end is connected to the branching member and the other end is connected to the bag; and
a combustor provided on a second pipe route connecting between the gas outlet and the cathode.

14. The system of claim 7, further comprising:
a first sensor configured to sense bubbles in a fluid flowing to the fuel tank;
a second sensor configured to sense bubbles in a fluid flowing out from the fuel tank; and
a calculation unit configured to calculate amounts of bubbles and liquid in the fuel tank, based on detection results of the first and second sensors.

* * * * *